Patented Feb. 12, 1929.

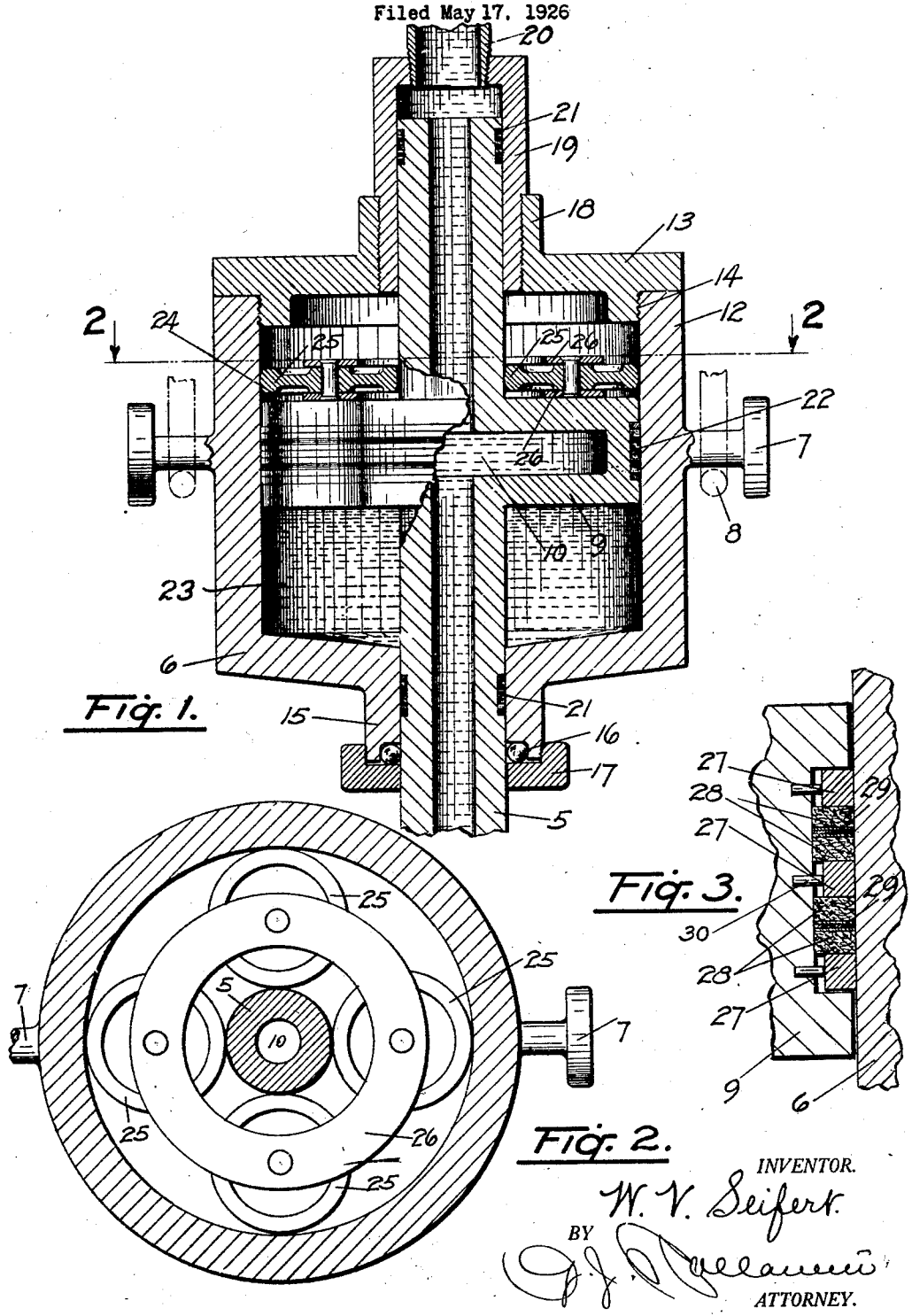

1,701,898

UNITED STATES PATENT OFFICE.

WILLIAM V. SEIFERT, OF DENVER, COLORADO.

SWIVEL.

Application filed May 17, 1926. Serial No. 109,625.

This invention relates to swivels for the rotary support of well-drilling tools and its primary object is to provide by means of a simple appliance, a fluid bearing for the rotary stem of the drilling tool, which permits of its rotary motion with little friction and wear. A body of liquid provided for the above-stated purpose, consists preferably of a viscous lubricant enclosed in a fluid tight chamber, by means of suitable packing devices.

A further object of the invention resides in the construction of the means by which the above mentioned chamber is formed, the means for supporting the drill stem on the liquid in the chamber, and the means for packing the chamber against the escape of fluid, and these and other objects relating to details of construction and a novel arrangement of parts are fully set forth in the following description made with reference to the accompanying drawings.

In these drawings in which like characters of reference designate corresponding parts throughout the several views, Figure 1 represents a sectional elevation of the swivel in operative relation to a vertically extending, rotary drill-stem;

Figure 2 a section in the horizontal plane indicated by the line 2—2 in Figure 1; and Figure 3 a sectional view of one of the packing rings used in the construction, drawn to an enlarged scale.

Referring more specifically to the drawings, 5 represents a hollow drill stem of the type used in well-boring equipment, and 6 a cylindrical container provided with headed trunnions 7 for the application of a bail 8 by which the swivel is suspended from the usual block on the well-drilling structure.

The drill stem has in integral connection therewith, a hollow piston 9 slidably fitted in the container, the interior space of the piston being connected with the axial bore of the stem by openings 10.

The cylinder 6 is composed of a body member 12 and a head-member 13 fastened together by a screw-thread as at 14.

The body-member has an integral bottom provided with a central sleeve 15 for the passage of the drill stem. The sleeve is recessed at its lower end for the application of a ball bearing 16, the balls of which are supported in a race provided by a flanged ring 17 screwed upon the extremity of the sleeve. Another similar sleeve 18 is formed on the head of the cylinder and is internally threaded for the attachment of a tubular extension 19 which at its upper end connects with a conduit 20 through which, in practise, water is supplied to the drill stem, to be conveyed to the tool at the lower end thereof.

The drill-tool is rotatably fitted in the sleeve 15 and the extension of the sleeve 18 and fluid tight joints around the moving stem within the relatively stationary parts, is maintained by means of packing rings 21 of a peculiar construction hereinafter to be described.

Similar rings 22 are placed around the piston to provide a fluid-tight joint with the wall of the cylinder. The space 23 of the cylindrical container below the piston is filled with a semi-liquid lubricant as indicated in Figure 1 of the drawings and the space 24 above the piston is occupied by a floating anti-friction steadying appliance which aids in holding the stem and the cylinder in coaxial relation to each other. The steadying device, best shown in Figure 2, consists of a plurality of wheels or rollers 25 engaging the concentric walls of the stem and the cylinder within the space 24, and mounted for rotation between two rings 26.

The packing rings used in providing the fluid-tight joints which prevent the lubricant from leaking from the chamber 23 or passing beyond the piston, and which at the upper end of the drill stem prevent water supplied through the conduit to the drill stem, from entering the cylinder, are composed of a plurality of metal rings 27 set in grooves of the moving parts, rings 28 of felt covering the faces of the rings 27 within the grooves, and layers 28 and 29 of beeswax and paraffin between the rings of felt. Pins 30 extending into grooves of the metal rings, prevent rotation of the rings. The pressure to which the packing devices are subject, causes the beeswax and paraffin to constantly engage with the stationary parts of the swivel thereby glazing the same and filling every crack, indentation or other irregularity of the surfaces thereof. It will thus be readily apparent that both the lubricant-space and the water space of the swivel are sealed against leakage under pressure and that the appliance requires little attention in use to constantly maintain it in an operative condition.

The body of lubricant provides a firm, and to some degree elastic, bearing for the drill stem, permitting of its rotary motion with the minimum of friction. The steadying device relieves the swivel from strain by relative lateral displacement of the drill stem, and the entire construction is easily assembled and applied, to take the place of any swivel used heretofore for the rotary support of drill stems in well-drilling equipment. The water admitted to the interior of the piston cools the lubricant upon which the piston is supported and thus aids in retaining its viscosity.

It is to be understood that while the swivel as shown in the drawings and herein described is particularly adapted for use in connection with drill stems of well-drilling tools, it may be employed in different associations as, for example, as an end-thrust bearing for propeller shafts.

Having thus described my invention what I claim and desire to secure by Letters Patent is:

1. The combination with a hollow rotary element, of a swivel comprising a movably suspended chamber, a fluid body in the chamber, and means for the rotary support of the element upon said fluid body.

2. The combination with a hollow rotary element, of a swivel comprising a movably suspended chamber, a body of lubricant in the chamber, and means for the rotary support of the element upon said body.

3. The combination with a hollow rotary element, of a swivel comprising a movably suspended chamber, a fluid body sealed in the chamber, and means for the rotary support of the element upon said fluid body.

4. A swivel comprising in combination with a hollow rotary element, a movably suspended container coaxial therewith, a fluid body in the container, and a piston rotatable with the element and slidably fitted within the container and supporting the element upon the fluid body.

5. A swivel comprising in combination with a rotary element, a container coaxial therewith, a fluid body in the container, means on the element for its rotary support upon said fluid body, and a steadying device adapted to maintain the axial coincidence of the container and the element.

6. A swivel comprising in combination with a rotary element, a container coaxial therewith, a fluid body in the container, means on the element for its rotary support upon said fluid body, and a steadying device including a plurality of rotary members engaging the container and the element in a space between the same.

7. A swivel comprising in combination with a rotary element, a container coaxial therewith, a fluid body in the container, means on the element for its rotary support upon said fluid body, and a steadying device including a plurality of rotary members engaging the container and the element in a space between the same, and a floating bearing for said members.

8. In well drilling apparatus, the combination with a hollow drill stem, of a swivel having a chamber, a fluid body in the chamber, a piston supporting the drill stem on the fluid body, a conduit connected with the swivel to supply a liquid to the stem, packing means confining the fluid body to the chamber, and packing means between the chamber and the connection of the swivel with the conduit.

9. In well drilling apparatus, the combination with a hollow drill stem, of a swivel having a chamber, a fluid body in the chamber, a piston on the stem having a space in the interior thereof that is an enlargement of the hollow portion of the drill stem, supporting the stem upon the fluid body, the hollow portions of the stem and piston being connected, and a conduit connected with the swivel for the supply of a liquid to the hollow stem and the hollow piston.

10. A swivel for drilling tools comprising in combination with a hollow drill stem, a container having a chamber and sleeves above and below the same, the drill stem passing through the lower sleeve and ending in the upper sleeve, a fluid body in the chamber, a piston supporting the stem on the fluid body, and a conduit connected with the upper sleeve to supply a liquid to the hollow stem.

11. The combination with a rotary element, of a swivel comprising a movably suspended chamber to move in a vertical line, trunnions on the chamber for its movable suspension, a fluid body in the chamber, and means for the rotary support of the element upon said fluid body.

12. A swivel comprising a container having a tubular extension, a fluid body in the container, a hollow rotary drill stem terminating in said extension, means on the drill stem for its rotary support on said fluid body, and means for feeding a liquid to the extension.

13. The combination with a rotary drill stem, of a swivel comprising a movably suspended chamber, a fluid body in the chamber, and means supporting the stem on the fluid body.

14. The combination of a hollow rotary drill stem, and a swivel comprising a chamber, a fluid body in the chamber, means supporting the drill stem on the fluid body, an extension for the chamber, and a conduit connecting a liquid supply with the interior of the extension, the drill stem having a nipple in the extension connecting the interior of same with the hollow drill stem.

In testimony whereof I have hereunto affixed my signature.

WILLIAM V. SEIFERT.